(12) United States Patent
Rule et al.

(10) Patent No.: US 12,154,096 B2
(45) Date of Patent: Nov. 26, 2024

(54) CONTACTLESS CREDIT CARD: FLEX TO ACTIVATE

(71) Applicant: Capital One Services, LLC, McLean, VA (US)

(72) Inventors: Jeffrey Rule, Chevy Chase, MD (US); Kevin Osborn, Newton Highlands, MA (US)

(73) Assignee: Capital One Services, LLC, McLean, VA (US)

(*) Notice: Subject to any disclaimer, the term of this patent is extended or adjusted under 35 U.S.C. 154(b) by 358 days.

(21) Appl. No.: 17/559,662

(22) Filed: Dec. 22, 2021

(65) Prior Publication Data

US 2023/0196336 A1 Jun. 22, 2023

(51) Int. Cl.
*G06Q 20/34* (2012.01)
*G06K 19/073* (2006.01)
*G06K 19/077* (2006.01)
*H01H 29/02* (2006.01)

(52) U.S. Cl.
CPC ......... *G06Q 20/354* (2013.01); *G06K 19/073* (2013.01); *G06K 19/07773* (2013.01); *H01H 29/02* (2013.01)

(58) Field of Classification Search
CPC .............. G06Q 20/354; G06K 19/073; G06K 19/07773; G06K 19/07345; H01H 29/02; H01H 2231/05
See application file for complete search history.

(56) References Cited

U.S. PATENT DOCUMENTS

| 6,073,856 | A | 6/2000 | Takahashi |
| 6,268,058 | B1 | 7/2001 | Tahon et al. |
| 6,343,744 | B1 * | 2/2002 | Shibata ............... G06K 19/005 235/487 |
| 6,371,378 | B1 | 4/2002 | Brunet et al. |
| 6,386,459 | B1 | 5/2002 | Patrice et al. |
| 6,424,029 | B1 * | 7/2002 | Giesler .............. G06K 19/0716 257/679 |
| 6,425,526 | B1 | 7/2002 | Fidalgo et al. |

(Continued)

FOREIGN PATENT DOCUMENTS

| JP | 3998820 | 10/2007 |
| WO | 2020185212 | 9/2020 |

OTHER PUBLICATIONS

International Search Report and Written Opinion issued in International Application No. PCT/US2022/050078 on Feb. 16, 2023.

*Primary Examiner* — Edwin A. Leon
(74) *Attorney, Agent, or Firm* — Foley & Lardner LLP (57) ABSTRACT

A method creates a banking card that may be a wireless banking card. The banking card has an antenna with an open circuit that prevents the banking card from functioning correctly until it is received by a banking customer the card is to belong to. A cavity is formed within the banking card near the open circuit and a thin wall is created between the cavity and the open circuit. The cavity is filled with a flowable electrical conductor that may be a liquid metal such as mercury or galinstan. Instruction indications are provided on the banking card indicating to a banking customer how to manipulate the banking card to cause the liquid conductor to flow and remove the open circuit and allow the banking card to function correctly.

20 Claims, 9 Drawing Sheets

(56) References Cited

U.S. PATENT DOCUMENTS

| | | | |
|---|---|---|---|
| 6,593,167 B2 | 7/2003 | Dobashi et al. | |
| 6,641,050 B2 | 11/2003 | Kelley et al. | |
| 7,100,835 B2 | 9/2006 | Selker | |
| 7,731,094 B2 | 6/2010 | Phillips | |
| 10,007,816 B2 | 6/2018 | DeBates et al. | |
| 10,108,898 B1 | 10/2018 | Ballam et al. | |
| 2003/0132301 A1* | 7/2003 | Selker | G06K 19/0716 235/487 |
| 2003/0183687 A1* | 10/2003 | Hogan | G07F 7/025 235/380 |
| 2004/0124248 A1 | 7/2004 | Selker | |
| 2007/0290051 A1 | 12/2007 | Bielmann et al. | |
| 2009/0039149 A1 | 2/2009 | Top | |
| 2013/0168454 A1* | 7/2013 | Oh | G07F 7/00 235/487 |
| 2015/0115039 A1 | 4/2015 | Mosteller | |

* cited by examiner

CONTACTLESS CREDIT CARD: FLEX TO ACTIVATE

BACKGROUND

Banking cards such as contactless wireless banking cards are often produced and then mailed to a banking customer through the postal system in an envelope. These cards are often shipped "live" in the postal system and can be used without further activation. Wireless cards are often produced and given at least a minimal spending limit before they are mailed. A bad actor can often read this card through the envelope using a mobile phone or another wireless device capable of reading wireless banking cards. With this capability, the bad actor can spend the minimal limit of the card, and the bad actor can be very hard to detect.

SUMMARY

The following presents a simplified summary to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description presented later.

Briefly described, the subject disclosure pertains to a method for creating a wireless banking card that may be a wireless banking card that is deactivated but can be activated by a banking customer receiving the banking card. The method includes creating the banking card with an antenna with an open circuit in the antenna that prevents the banking card from functioning correctly. A cavity is created within the banking card near the open circuit and the cavity is filled with a flowable electrical conductor that may be a liquid metal. The liquid metal may be galinstan, or liquid mercury, or the like. The method creates a thin wall between the cavity and the open circuit. The thin wall may be a polymer membrane. Instruction indications to a banking customer, are provided, on how to manipulate the banking card to cause the liquid conductor to flow and remove the open circuit and allow the banking card to function correctly. In some instances, the method may include mailing the banking card to the banking customer.

The method may include other useful features and configurations. When the wireless banking card is received by the banking customer, the thin wall is to be broken, by flexing the card, to allow the flowable electrical conductor to flow out from the cavity and onto the open circuit. The thin wall may be broken by flexing the wireless banking card back and forth by grabbing onto opposite ends of the card with the banking customer's hands/fingers and manually flexing those two ends to break the thin wall to allow the flowable electrical conductor to flow out from the cavity and onto the open circuit to eliminate the open circuit. Alternatively, a portion of the banking card is configured to be depressed with a finger to break the thin wall to allow the flowable electrical conductor to flow out of the cavity and eliminate the open circuit. In some instances, a notched or grooved portion of the banking card defines, to the banking customer, where the card may be flex to break the thin wall and eliminate the open circuit.

In another implementation, a banking card is created, that may be a wireless banking card. The banking card has an antenna with an open circuit that prevents the banking card from functioning correctly until it is received by a banking customer. A cavity is formed within the banking card near the open circuit and a thin wall is created between the cavity and the open circuit. The cavity is filled with a flowable conductor that may be a liquid metal such as mercury or galinstan. Instruction indications are provided on the banking card indicating to a banking customer how to manipulate the banking card to cause the liquid conductor to flow from the cavity and remove the open circuit and allow the banking card to function correctly.

Some instances use a flow in material that can be any suitable conductive substance that would flow and stay in place, as understood by one of ordinary skill in the art. One example would be separated components of conductive epoxy. Separated components of conductive epoxy would flow and mix together, and harden to provide a conductive path. In another example conductive particles, such as metallic beads, are suspended in a gel substance, but also may provide a conductive pathway. In yet another example, the metallic beads may be mixed with a resin and then harden to provide a conductive pathway. In some instances a carbon fiber may be mixed with a matrix compound such as polymer, liquid plastic resin, or another similar compound with the resulting compound flowed into a desired conductive shape.

According to another aspect, a method provides a banking customer a banking card. In some implementations, the banking card is a wireless banking card. The method may begin by producing a first portion of the banking card that has an open circuit. A second portion of the banking card is produced that has a connector for completing the open circuit. The second portion of the banking card is also produced with a locking mechanism. The first portion of the banking card is adapted to be slid together with the second portion of the banking card and the locking mechanism is adapted to attach the first portion of the banking card to the second portion of the banking card.

In another aspect, the method of providing a banking customer a banking card may further form the locking mechanism with a tang extending from the first portion of the banking card. The locking mechanism further forms a recessed area in the second portion of the banking card. The first portion of the banking card is adapted to be slid, at least partially, together with the second portion of the banking card to attach the first portion of the banking card to the second portion of the banking card. The tang of the first portion of the banking card extends into a recessed area of the second portion of the banking card locking the first portion of the banking card to the second portion of the banking card when the locking mechanism is in a locked position. In this locked position, the open circuit is removed.

In accordance with another aspect, a method executes, on a processor, instructions that cause the processor to perform operations associated with a function for generating a new wireless banking card. According to one aspect, the method includes generating a request for the new wireless banking card to be created with a wireless banking card number associated with a banking customer. A request is generated to indicate that the new wireless banking card will have an open circuit so that it will not be functional until receipt by a designated banking card customer. However, upon receipt of the card, the banking customer causes a conductive material to flow across the open circuit to eliminate the open circuit and make the wireless banking card operational.

Other scenarios have other useful features and characteristics. For example, the method for creating wireless banking cards may use a liquid metal such as galinstan or mercury as the conductive material. In another aspect, the method may generate a request that the new wireless banking card be mailed to the banking customer.

To the accomplishment of the foregoing and related ends, certain illustrative aspects of the claimed subject matter are described herein in connection with the following description and the annexed drawings. These aspects indicate various ways in which the subject matter may be practiced, all of which are intended to be within the scope of the disclosed subject matter. Other advantages and novel features may become apparent from the following detailed description when considered in conjunction with the drawings.

BRIEF DESCRIPTION OF THE DRAWINGS

One or more preferred embodiments that illustrate the best mode(s) are set forth in the drawings and in the following description. The appended claims particularly and distinctly point out and set forth the invention.

The accompanying drawings, which are incorporated in and constitute a part of the specification, illustrate various example methods and other example embodiments of various aspects of the invention. It will be appreciated that the illustrated element boundaries (e.g., boxes, groups of boxes, or other shapes) in the figures represent one example of the boundaries. It is appreciated that in some examples, one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Banking cards such as contactless wireless banking cards are often produced and then mailed to a banking customer through a postal system in an envelope. These cards are often shipped "live" in the postal system and can be used without further activation. Wireless cards are often produced and given at least a minimal spending limit before they are mailed. A bad actor can often read this card through the envelope using a mobile phone or another wireless device capable of reading wireless banking cards. With this capability, the bad actor can spend the minimal limit of the card; and the bad actor can be very hard to detect. To prevent a bad actor from accessing an account associated with the banking card, the antenna of the banking card is disabled until it reaches the banking customer. In one instance, the antenna can be disabled by creating an open circuit in the antenna so that it is disconnected and prevents the card from working properly. In another instance, the banking card can be formed of two different pieces and mailed to the banking customer in two different envelopes. After the banking customer receives both pieces of the card, the customer combines the pieces, similar to two "puzzle pieces", and creates the final functional card.

In more detail, a contactless smart card (banking card) is a contactless credential whose dimensions are credit-card size. In some instances, a contactless smart card has embedded integrated circuits that can store (and sometimes process) data and communicate with a terminal via a near field communication (NFC) system that is an electromagnetic system using an antenna on the contactless banking card. Commonplace uses include transit tickets, banking cards, passports and other types of wireless cards. There are two broad categories of contactless banking cards/smart cards. Memory cards contain non-volatile memory storage components, and perhaps some specific security logic. Contactless smart cards contain read-only radio frequency identification (RFID) called CSN (Card Serial Number) or unique identifier (UID), and a re-writeable smart card microchip that can be transcribed via radio waves.

A contactless smartcard or wireless banking card may contain a security system with tamper-resistant properties (e.g. a secure crypto-processor, secure file system, human-readable features) and is capable of providing security services (e.g. confidentiality of information in the memory). Card data is transferred via radio waves to the central administration system through card read-write devices, such as point of sales devices, doorway access control readers, ticket readers, automated teller machines (ATMs), universal serial bus connected (USB-connected) desktop readers, etc. A banking account or other assets associated with a wireless banking card may be managed by way of a central administration systems, or applications, which receive or interchange information with the card.

Details disclosed herein generally pertain to a way of protecting wireless banking cards that involves disabling the wireless banking card until they are delivered to an intended banking customer. A system can be employed that produces wireless banking cards that are initially deactivated before the cards arrive to intended banking customers. In one configuration, an open circuit can be formed in a wire forming an antenna of the wireless banking card so that the card is inoperable. A pocket of conductive material may be placed next to the open circuit. After the card has arrived at an intended banking customer, the card may be flexed near the conductive material to allow the electrically conductive material to flow or be forced over both ends of the antenna wire forming the open circuit to remove the open circuit. A thin membrane may separate the conductive material and the open circuit and the thin membrane may be broken by the flexing of the card or depressing a region of the card adjacent the conductive material. In another configuration, the wireless card may consist of two separate pieces that may be mailed separately in two different envelopes. The two "puzzle" pieces of the wireless banking card are combined by the banking customer to form a functional banking card.

Various aspects of the subject disclosure are now described in more detail with reference to the annexed drawings, wherein like numerals generally refer to like or corresponding elements throughout. It should be understood, however, that the drawings and detailed description relating thereto are not intended to limit the claimed subject matter to the particular form disclosed. Instead, the intention is to cover all modifications, equivalents, and alternatives falling within the spirit and scope of the claimed subject matter.

Figure 1:
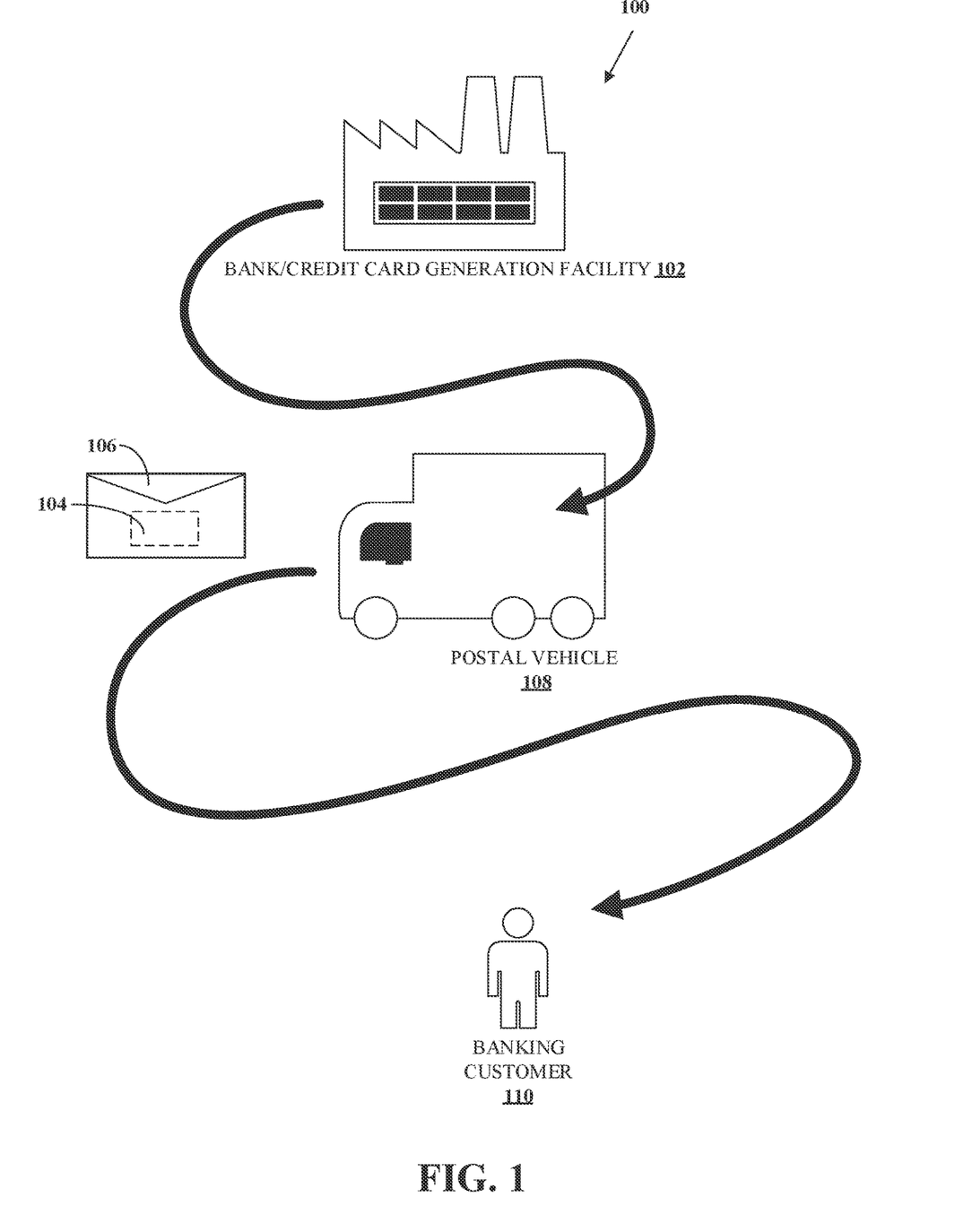
FIG. 1 illustrates an overview of an example implementation.

Referring initially to FIG. 1, a high-level overview of an example implementation of a system 100 for delivering a banking card 104, and in particular a wireless banking card 104, to a banking customer 110. The system 100 includes a bank 102 that directs the creation/generation of a wireless banking card 104. As mentioned above, the wireless banking card 104 may be compromised by a bad actor reading the card's data with an NFC device. To protect against bad actors, the bank 102 will have the wireless banking card 104 produced so that it is disabled until the card 104 reaches the customer 110. For example, the wireless banking card 104 may be produced so that the wireless banking card antenna has an open circuit and the wireless banking card 104 is not functional. The bank 102 then has the wireless banking card 104 mailed, in one embodiment, in an envelope 106 through a postal system that may have postal vehicles 108 for delivering the banking card 104 to the banking customer 110. Once the wireless banking card 104 arrives at the banking customer 110, the banking customer 110 can re-enable the banking card 104 by removing or reconnecting an open circuit, for example.

Figure 2A:
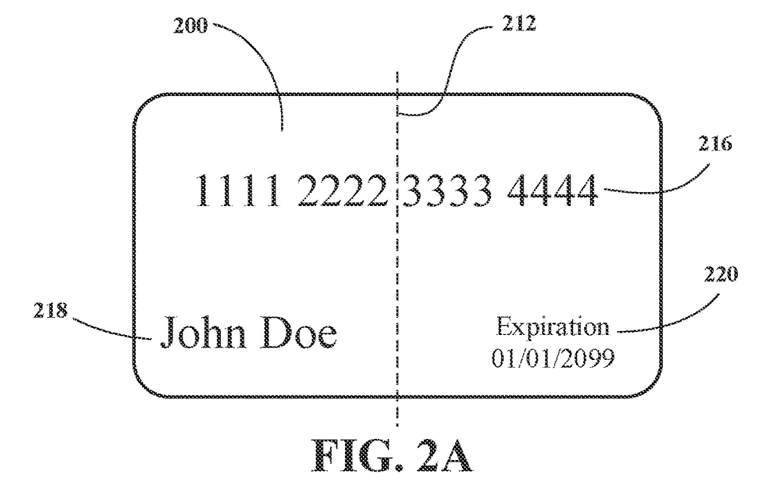
FIGS. 2A-C are example views of a banking card.
Figure 2B:
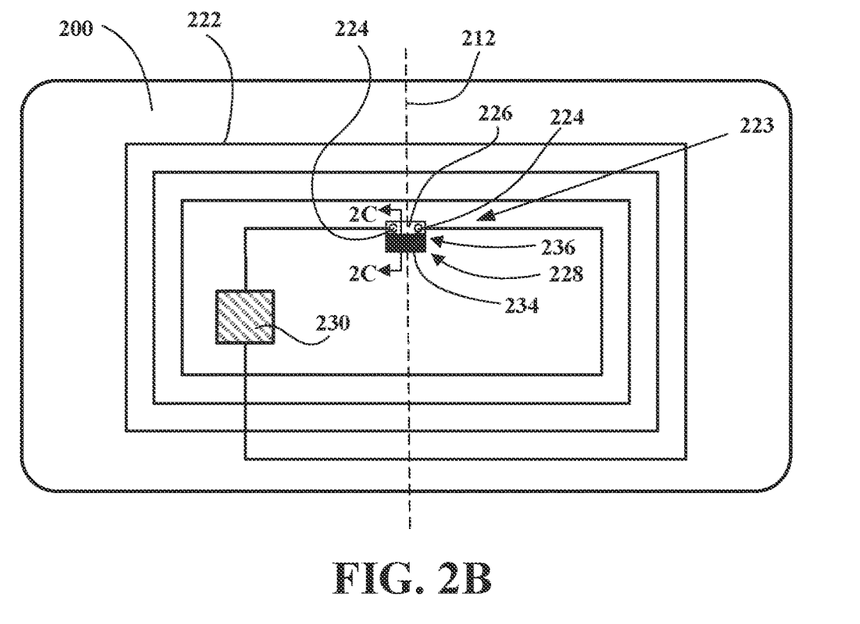

Turning attention to FIGS. 2A-2C, an example wireless banking card 200 with an open antenna circuit security feature is illustrated. As can be seen in FIG. 2A, a front side of the wireless banking card can be illustrated with a card number 216 as well as its users name 218, and an expiration date 220. FIG. 2B illustrates an example view of a slice through the wireless banking card 200 illustrating the open circuit 223 of the antenna 222. As illustrated, a wire spirals around a center of the wireless banking card 200 to form the antenna 222. The antenna 222 enters and exits from a computer chip 230 and terminates at two respective ends 224 that form the open circuit 223. The computer chip 230 may have some processing power to process signals received from the antenna 222 and that are to be radiated from the antenna 222.

The open circuit 223 is formed, on this example card 200, near a centerline 212 of the wireless banking card 200, but the open circuit 223 may be formed in other places on the wireless banking card 200. In other embodiments, the open circuit 223 may even be formed in other circuits, as understood by those of ordinary skill in this art, that do not include the antenna 222.

Figure 2C:
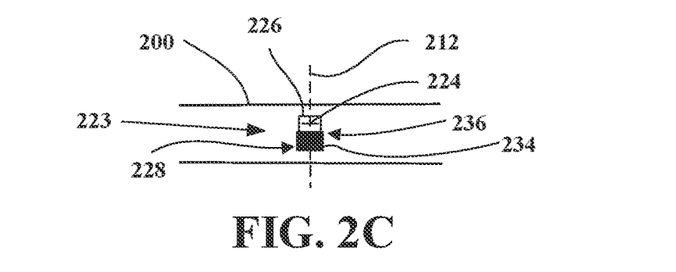

As best seen in FIGS. 2B-C, the open circuit 223 is formed by the gap between the two separated terminal ends 224 of the antenna circuit 222 and in an open circuit chamber 226 (e.g., cavity). A conductive liquid chamber 228 is formed adjacent the open circuit chamber 226. The conductive liquid chamber 228 (e.g., cavity) stores a conductive liquid 234 that when released, removes the open circuit 223. A thin wall 236 separates the open circuit chamber 226 from the conductive liquid chamber 228. Thus, when the thin wall 236 is broken or otherwise allows the conductive liquid 234 to flow onto the open circuit 223 and remove/repair the open circuit 223. The conductive liquid chamber 228 (e.g., cavity) is filled with a liquid metal (e.g., conductive liquid 234). In other instances the liquid metal may be mercury or galinstan.

Other embodiments may use a flow in material that can be any suitable conductive substance that would flow and stay in place, as understood by one of ordinary skill in the art. One example would be separated components of conductive epoxy. Separated components of conductive epoxy would flow and mix together, and harden to provide a conductive path. In another example conductive particles, such as metallic beads, are suspended in a gel substance, but also may provide a conductive pathway. In yet another example, the metallic beads may be mixed with a resin and then harden to provide a conductive pathway. In some instances a carbon fiber may be mixed with a matrix compound such as polymer, liquid plastic resin, or another similar compound with the resulting compound flowed into a desired conductive shape.

Figure 3A:
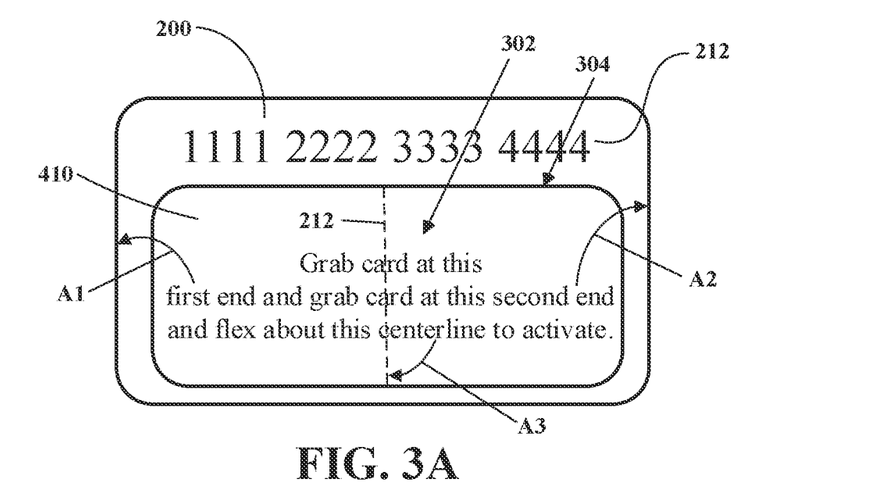
FIGS. 3A-C are example views of how to flex a banking card.

According to another aspect, the wireless banking card 200 is at least somewhat flexible and may be flexed to break the thin wall 236 to allow the liquid metal (e.g., conductive liquid 234) to flow into the open circuit cavity 226 by flexing the wireless banking card 200. Turning now to FIG. 3A, instruction indications 302 on the wireless banking card 200 instruct a banking customer how to manipulate and flex the wireless banking card 200 to cause the liquid metal 234 to flow and remove the open circuit 223 and allow the wireless banking card 200 to function correctly. As indicated in FIG. 3A, the instruction indications 302 may indicate and show the banking customer were to grab the card and how to flex the card 200: "Grab card at this first end and grab card at this second end and flex about this centerline to activate." These instruction indications 302 may be printed on a sticker 304 that is attached to the banking card and that may be easily removed after the wireless banking card 200 is activated. Arrows A1-A2 (on the instruction indications 302 of FIG. 3A) may indicate were to grab the card for flexing and arrow A3 may indicate a centerline 212 about which the wireless banking card 200 is to be flexed.

Figure 3B:
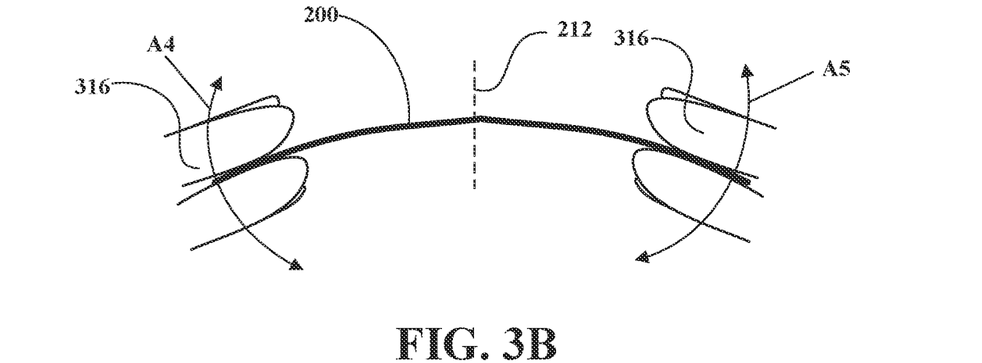
Figure 3C:
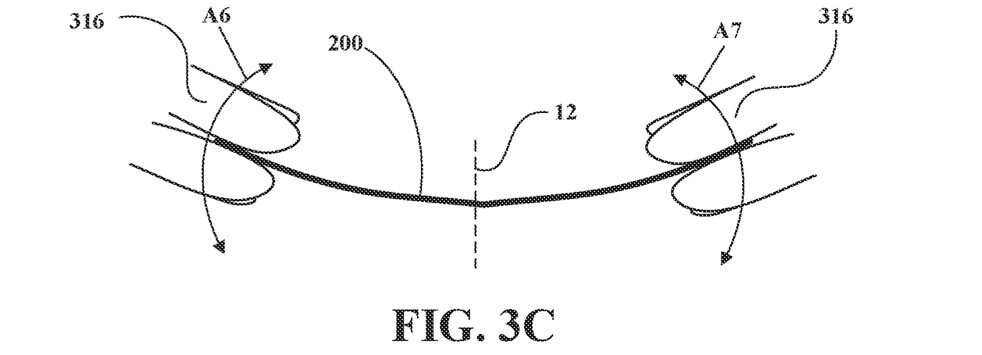

FIGS. 3B-C illustrate the processes of a banking customer flexing the wireless banking card 200 and breaking the thin wall 236 so that it is ruptured and allows the liquid metal (e.g., conductive liquid 234) to flow into the a cavity (e.g., chamber 226) and onto the open circuit 223 to eliminate the open circuit 423. FIG. 3B illustrates an example of the wireless banking card being flexed about centerline 212. This is accomplished by grabbing, with the banking customer's fingers 316, the wireless banking card 200 at opposite sides as indicated by the instruction indications 302 in FIG. 3A and twisting so that the banking card middle section at the centerline 212 is forced upward as shown in FIG. 3B. Next, FIG. 3C illustrates an example of the wireless banking card 200 being flexed about centerline 212. This is accomplished by grabbing, with the banking customer's fingers 316, the wireless banking card 200 at opposite sides as indicated by the instruction indications 302 in FIG. 3A and twisting so that the banking card middle section at the centerline 212 is forced downward as shown in FIG. 3C. Those of ordinary skill in this art will appreciate other ways to twist the wireless banking card 200 so that the thin wall 236 is ruptured and flows liquid metal (e.g., conductive liquid 234) from conductive liquid chamber 228 into the open circuit cavity 226 (e.g., chamber) and onto the open circuit 223 to eliminate the open circuit.

Figure 4A:
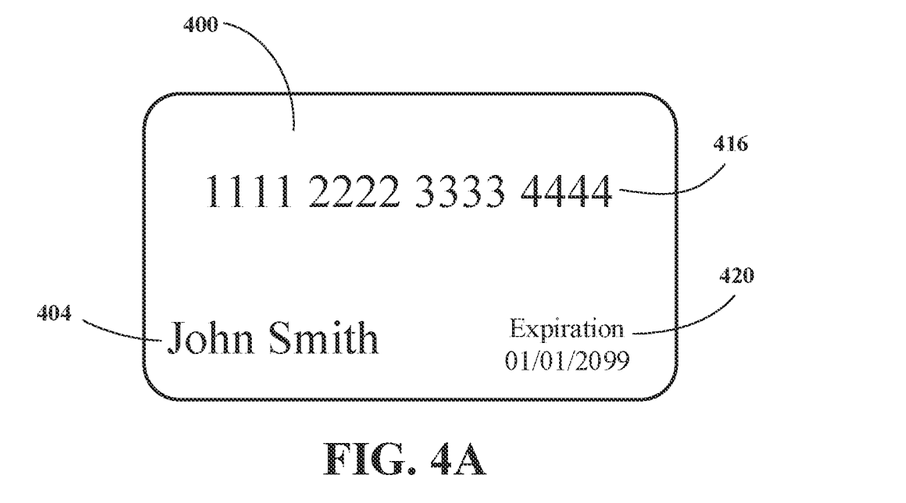
FIGS. 4A-C are example views of a notched banking card.
Figure 4B:
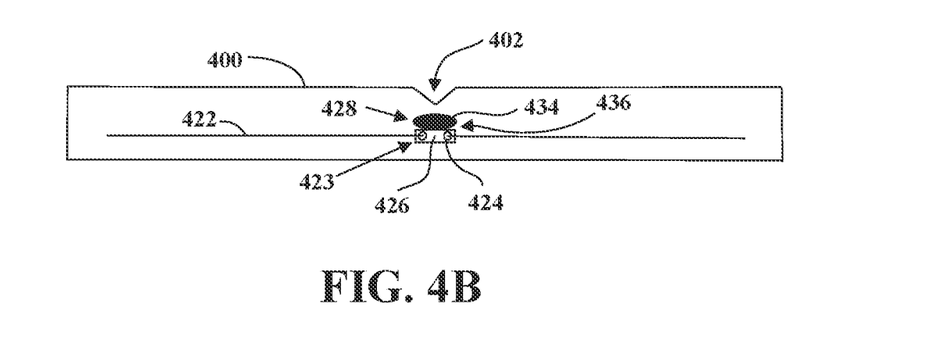

Turning attention to FIGS. 4A-2C, an example wireless banking card 400 with an open antenna circuit security feature similar to the banking card 200 of FIGS. 2A-C is illustrated. As can be seen in FIG. 4A, a front side of the wireless banking card can be illustrated with a card number 416 as well as its users name 404 and an expiration date 420. FIG. 4B illustrates an example view of a slice through the wireless banking card 400 illustrating the open circuit 423 of an antenna 422. The open circuit 423 includes two separated terminal ends 424 of the antenna circuit 422. A conductive liquid chamber 428 is formed in the wireless banking card 400 to contain a conductive liquid 434. An open circuit chamber 426 is formed between the two terminal ends 424 of the antenna 422 and adjacent to the conductive liquid chamber 428 containing a conductive liquid 434.

The open circuit 423 prevents the wireless banking card 400 from functioning correctly. A thin wall 436 is located between the open circuit chamber 426 and the conductive liquid chamber 428. The chamber 428 is filled with a liquid metal (e.g., conductive liquid 434). In other instances the liquid metal may be mercury or galinstan.

According to another aspect, the wireless banking card 400 is at least somewhat flexible and may be flexed to break the thin wall 436 to allow the liquid metal (e.g., conductive liquid 434) to flow into the open circuit chamber 426 by flexing the wireless banking card 400. As illustrated previously in FIG. 3A, instruction indications 302 on the wireless banking card 400 instruct a banking customer how to manipulate and flex the wireless banking card 400 to cause the liquid metal to flow and remove the open circuit 423 and allow the wireless banking card 400 to function correctly.

Figure 4C:
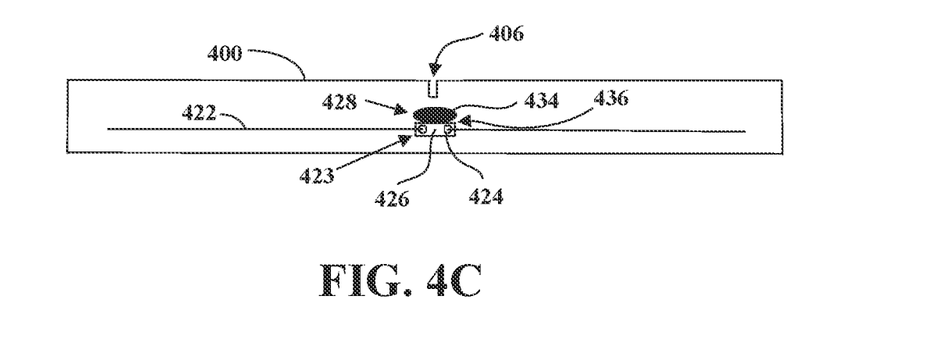

FIGS. 4B-C illustrate to examples of perforated or pre-partially cut or sliced wireless banking cards. FIG. 4B illustrates an example cross-sectional view of the wireless banking card of FIG. 4A that illustrates a "triangular" shaped notch 402 while FIG. 4C illustrates an example cross-sectional view of the wireless banking card 400 of FIG. 4A that illustrates a rectangular shaped notch 406. These notches 402, 406 can help guide a banking customer how to flex the banking card 400 in order to eliminate the open circuit 423 and make the wireless banking card functional.

Figure 5A:
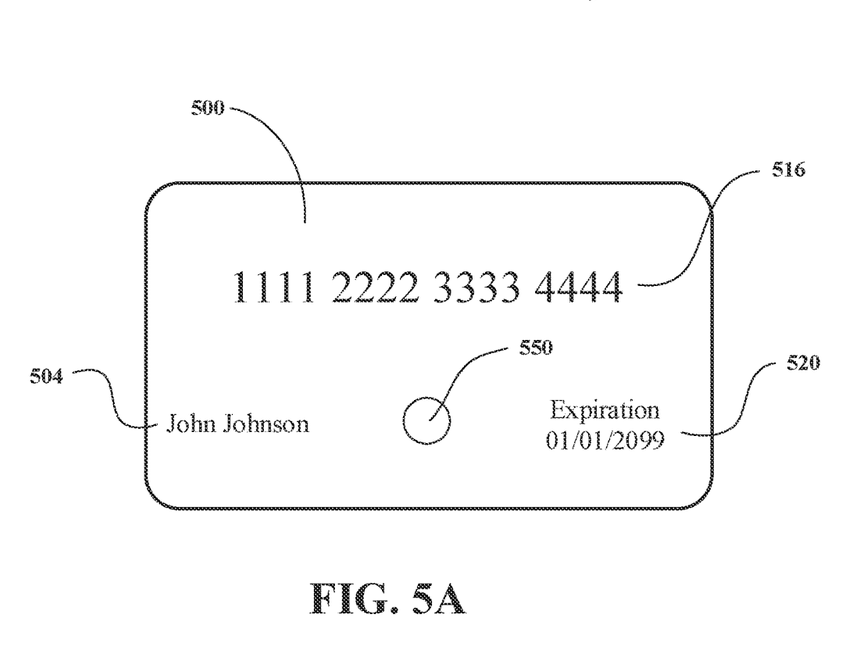
FIGS. 5A-C are example views of another banking card.
Figure 5B:
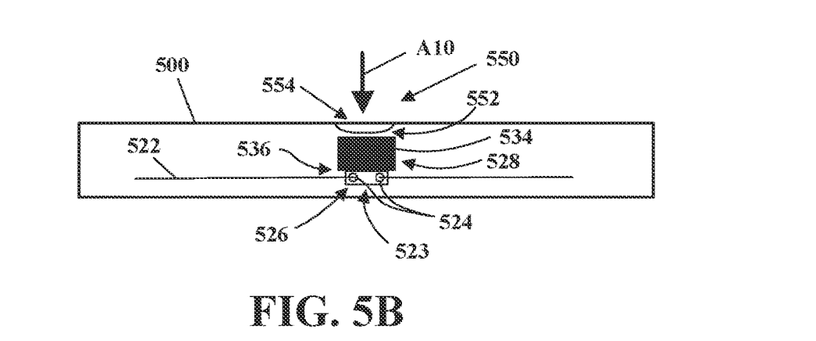
Figure 5C:
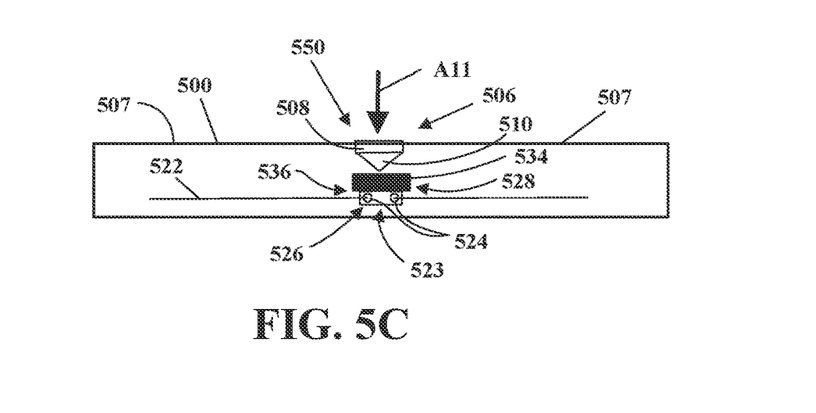

FIG. 5A illustrates another example of a wireless banking card and FIGS. 5B-C, illustrate different configurations of the wireless banking card of FIG. 5A where a portion 550 of the wireless banking card 500 is configured to be depressed to break the thin wall 536 to allow a flowable conductor to flow into an open circuit chamber 526 and eliminate the open circuit 523. FIGS. 5A-C illustrate an embodiment of an example wireless banking card 500 with an open antenna circuit security feature somewhat similar to the banking card 200 of FIGS. 2A-C. As can be seen in FIG. 5A, a front side of the wireless banking card can be illustrated with a card number 516 as well as its users name 504 and an expiration date 520.

FIG. 5B illustrates an example view of a slice through the wireless banking card 500 illustrating the open circuit 523 of an antenna 522. The open circuit 523 includes two separated terminal ends 524 of the antenna circuit 522 and a conductive liquid chamber 528 formed in the wireless banking card 500 to contain a conductive liquid 534. As best seen in FIGS. 5B and 5C, an open circuit chamber 526 is formed between the two terminal ends 524 of the antenna 522 and adjacent to the conductive liquid chamber 528 that contains a conductive liquid 534. A thin wall 536 is located between the conductive liquid chamber 528 and the open circuit 523. The conductive liquid chamber 528 is filled with a liquid metal (e.g., conductive liquid 534). In other instances, the liquid metal may be mercury or galinstan.

The open circuit 523 prevents the wireless banking card 500 from functioning correctly. To correct this situation, this aspect of the wireless banking card 500 may have an area (e.g., portion) 550, see FIG. 5A, that is somewhat flexible. This area may be pressed downward in the directions of arrows A10 and A11 as shown in FIGS. 5B-5C. The flexible area (e.g., portion) 550 may be pressed enough by a banking customer's finger to erupt the thin wall 536 to allow the liquid metal 534 to flow out of the liquid metal chamber 528 and onto the open circuit 523 to eliminate the open circuit 523 to allow the wireless banking card to function properly. As illustrated previously in FIG. 3A, instruction indications 302 on the wireless banking card 500 may be used to instruct a banking customer how to manipulate and press downward onto the wireless banking card 500 to cause the liquid metal 534 to flow and remove the open circuit 523 and allow the wireless banking card 500 to function correctly.

FIGS. 5B and 5C illustrate two different example ways of rupturing the thin wall 536. FIG. 5B has an area of thin wireless banking card material 552 on a wireless banking card 500. When the thin wireless banking card material 552 is pressed hard enough by a finger in the direction of arrow A10, the upper surface 554 above the liquid metal 534 is pushed onto/into the liquid metal chamber 528. This pressure on the liquid metal chamber 528 creates enough pressure to rupture the thin wall 536. This rupturing, allows the liquid metal 534 to flow from the liquid metal chamber 528 onto the open circuit 523 to eliminate the open circuit 523 and make the wireless banking card 500 functional.

FIG. 5C illustrates another different embodiment of a portion 550 of the wireless banking card 500 that is configured to be depressed to break the thin wall 536 to allow the flowable electrical conductor 534 to flow into the open circuit chamber 526 and eliminate the open circuit 223. In this embodiment, a push button 506 may be located just under a surface of the wireless banking card 500. In other embodiments, an upper surface of the push button 506 may be flush with the upper surface 507 of the wireless banking card 500. In yet another embodiment, the upper surface of the push button 506 may be may extend slightly above the upper surface 507 of the wireless banking card to further indicate to a banking customer where the push button 506 needs to be depressed to activate the wireless banking card 500.

In one instance, the push button 506 includes a cylindrical portion 508 and a conical puncturing portion 510. An upper surface of the cylindrical portion 508 can be located just below the upper surface 507 of the wireless banking card 500 and may be located just under a membrane or other material forming the upper surface 507. In another instance, the cylindrical portion 508 may extend partially above the upper surface 507. The conical puncturing portion 510 may be conical in shape with a point of the conical shape pointing downward toward the liquid metal chamber 528 or in contact with the liquid metal chamber 528.

In operation, the push button 506 may be pressed enough by a banking customer's finger to erupt, with the downward pointed end of the conical puncturing portion 510, the thin wall 536 to allow the liquid metal 534 to flow out of the liquid metal chamber 528 and onto the open circuit 523 to eliminate the open circuit 523 to allow the wireless banking card 500 to function properly. As illustrated previously in FIG. 3A, instruction indications 302 on the wireless banking card 500 instruct a banking customer how to manipulate and flex the wireless banking card 500 to cause the liquid metal to flow in order to remove the open circuit 523 and allow the wireless banking card 500 to function correctly.

Some instances use a flow in material that can be any suitable conductive substance that would flow and stay in place, as understood by one of ordinary skill in the art. One example would be separated components of conductive epoxy. Separated components of conductive epoxy would flow and mix together, and harden to provide a conductive path. In another example conductive particles, such as metallic beads, are suspended in a gel substance, but also may provide a conductive pathway. In yet another example, the metallic beads may be mixed with a resin and then harden to provide a conductive pathway. In some instances a carbon fiber may be mixed with a matrix compound such as polymer, liquid plastic resin, or another similar compound with the resulting compound flowed into a desired conductive shape.

Figure 6:
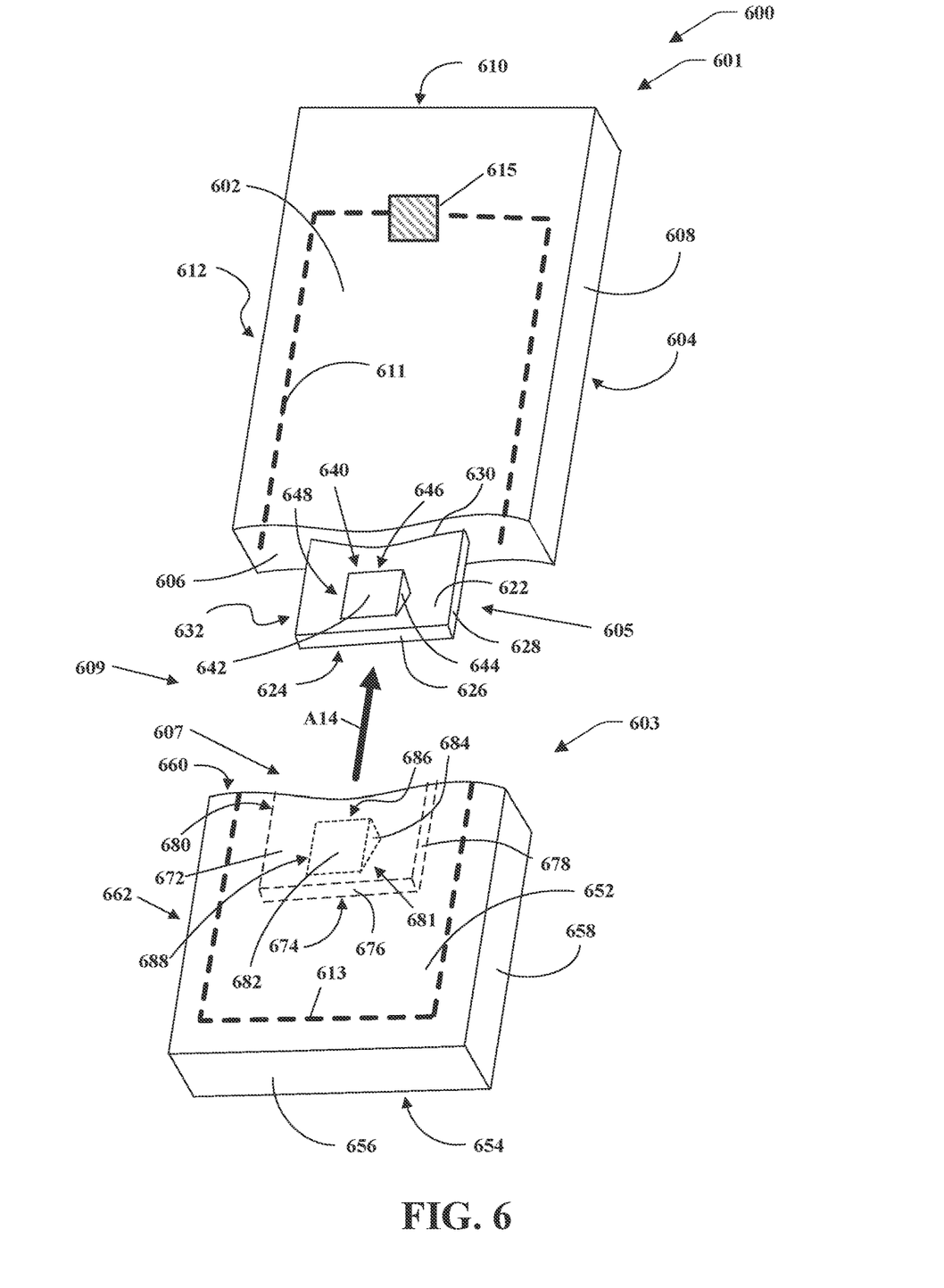
FIG. 6 is an example view of a two piece banking card.

FIG. 6 illustrates an example instance of a wireless banking card 600 that includes a first portion of the banking card 601 and a second portion of the banking card 603. The first portion of the banking card 601 has a protrusion assembly 605 extending from the first portion of the banking card 601 and the second portion of the banking card 603 has a locking recessed area 607. When the first portion of the banking card 601 is connected to the second portion of the banking card 603, an open circuit between the two antenna halves 611, 613 in each of the two card portions 601, 603 is completed to remove and open circuit and provide for a full functional wireless banking card 600. The protrusion assembly 605 and the locking recessed area 607 form a locking mechanism 609 discussed further below.

The first portion of the banking card 601 has a first portion top side 602, a first portion bottom side 604, a first portion front side 606, a first portion right side 608, a first portion back side 610, and a first portion left side 612. The protrusion assembly 605 extends from the first portion front side 606 of the first portion of the banking card 601. The protrusion assembly 605 has a protrusion top wall 622, a protrusion bottom wall 624, a protrusion front wall 626, a protrusion right wall 628, a protrusion back wall 630, and a protrusion left wall 632. The protrusion top wall 622 has a beveled tang 640 extending therefrom. The beveled tang 640 has a beveled (e.g., sloped) top tang wall 642, a right tang wall 644, a back tang wall 646, and a left tang wall 648.

The second portion of the banking card 603 has a second portion top side 652, a second portion bottom side 654, a second portion front side 656, a second portion right side 658, a second portion back side 660, and a second portion left side 662. The locking recessed area 607 forms a cavity/chamber extending into the second portion back side 660 of the second portion of the banking card 603. The locking recessed area 607 has a recessed area cavity formed with a recessed area top wall 672, a recessed area bottom wall 674, a recessed area front wall 676, a recessed area right wall 678, and a recessed area left wall 680. The recessed area top wall 672 further includes a recessed tang area 681. The recessed tang area 681 is for receiving, as further described below, the beveled tang 640. The recessed tang area 681 includes a recessed area top wall 682, a recessed area right wall 684, a recessed area back wall 686, and a recessed area left wall 688.

The first portion of the banking card 601 and the second portion of the banking card 603 are separated at production so there is an open circuit between antenna wire portions 611 and 613. In example FIG. 6, the antenna wire 611 of the first portion of the banking card 601 exits a microchip 615 and loops toward first portion front side 606 where it is terminated and becomes an open circuit. Similarly, antenna wire 613 of the second portion of the banking card 603 loops partly around the second portion of the banking card 603 and terminates both ends of antenna wire 613 in the second portion back side 660 creating another open circuit. In example FIG. 6, only one loop of the antenna is illustrated for simplicity: however, in other instances multiple antenna wire loops can be implemented.

In operation, the first portion of the banking card 601 and the second portion of the banking card 603 are produced and then separated and mailed in different envelops or other packaging to a banking customer. This prevents a bad actor from intercepting and using the completed and working wireless banking card 600. Alternatively, the first portion of the banking card 601 and the second portion of the banking card 603 may be mailed at different times. Once the banking customer has received both the first portion of the banking card 601 and the second portion of the banking card 603, he/she can combine them by sliding, in the direction of arrow A14, the protrusion assembly 605 into the locking recessed 607 area of the second portion of the banking card 603. This action will make contact between the different antenna portions of both antenna halves 611, 613 of the wireless banking card 600 so that the wireless banking card 600 is fully functional.

When the first portion of the banking card 601 and the second portion of the banking card 603 are slid fully together, the locking mechanism 609 will lock the two portions together. In one example, when the beveled tang 640 of the first portion of the banking card 601 extends into the locking recessed area 607 of the second portion of the banking card 603 an adequate distance, the beveled tang 640) will lock the first portion of the banking card 601 to the second portion of the banking card 603. In more detail, the locking action occurs when the back tang wall 646 of the beveled tang 640) drops behind the recessed area back wall 686 of the recessed tang area 681. In this position, the locking mechanism is in the locked position.

The aforementioned systems, architectures, platforms, environments, or the like have been described with respect to interaction between several logics and components. It should be appreciated that such systems and components can include those logics and/or components or sub-components and/or sub-logics specified therein, some of the specified components or logics or sub-components or sub-logics, and/or additional components or logics. Sub-components could also be implemented as components or logics communicatively coupled to other components or logics rather than included within parent components. Further yet, one or more components or logics and/or sub-components or sub-logics may be combined into a single component or logic to provide aggregate functionality. Communication between systems, components or logics and/or sub-components or sub-logics can be accomplished following either a push and/or pull control model. The components or logics may also interact with one or more other components not specifically described herein for the sake of brevity but known by those of skill in the art.

Figure 7:
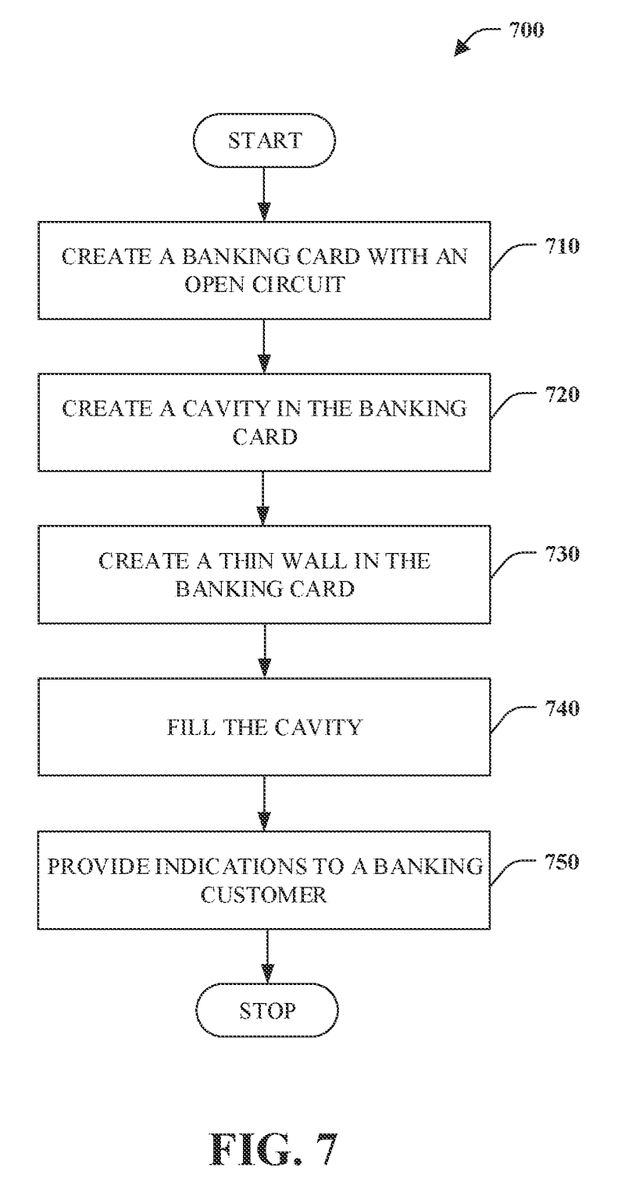
FIG. 7 is a flow chart diagram of a banking card production method.
Figure 8:
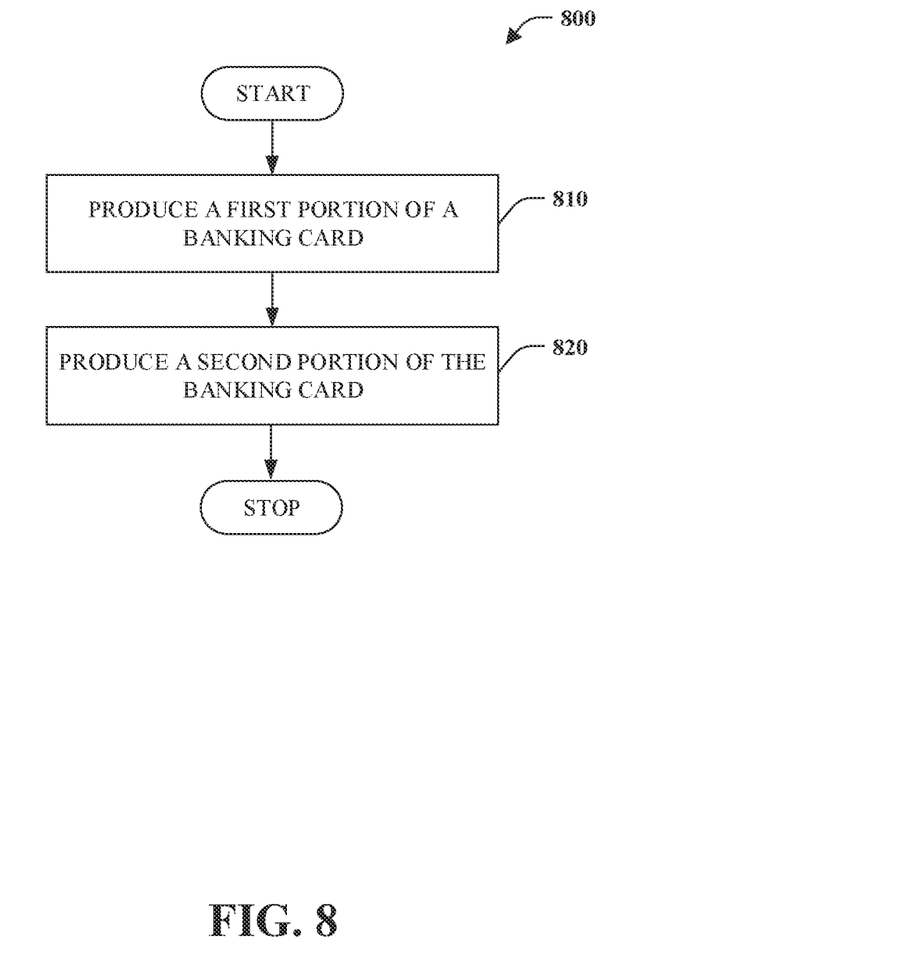
FIG. 8 is a flow chart diagram of another banking card production method.
Figure 9:
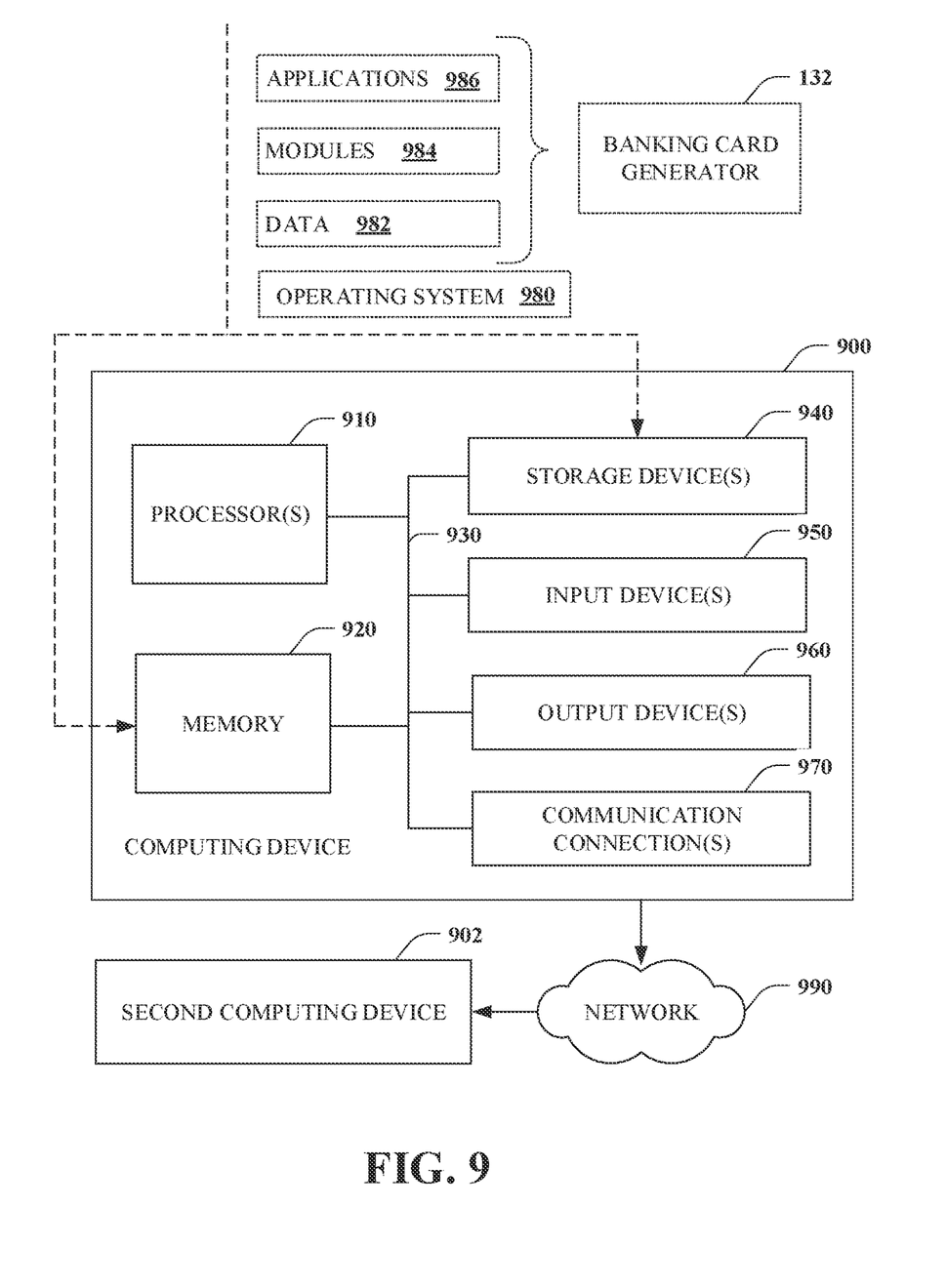
FIG. 9 is a block diagram illustrating a suitable operating environment for aspects of the subject disclosure.

In view of the example systems described above, methods that may be implemented in accordance with the disclosed subject matter will be better appreciated with reference to flow chart diagrams of FIGS. 7-9. While for purposes of simplicity of explanation, the methods are shown and described as a series of blocks, it is to be understood and appreciated that the disclosed subject matter is not limited by order of the blocks, as some blocks may occur in different orders and/or concurrently with other blocks from what is depicted and described herein. Moreover, not all illustrated blocks may be required to implement the methods described hereinafter. Further, each block or combination of blocks can be implemented by computer program instructions that can be provided to a processor to produce a machine, such that the instructions executing on the processor create a means for implementing functions specified by a flow chart block.

Turning attention to FIG. 7, a method 700 for securely distributing banking cards to banking customers is depicted in accordance with an aspect of this disclosure. The method 700 may more particularly distribute wireless banking cards to banking customers. The method 700 can be implemented and performed by using, at least in part, the banking card 200 that is illustrated in FIG. 2.

At reference numeral 710, a banking card is created with an open circuit. The open circuit prevents the banking card from functioning correctly. The open circuit may be created in an antenna of the banking card. The antenna may loop around a perimeter of the banking card several times.

At reference numeral 720, the method creates a cavity within the banking card. The cavity may be created near the open circuit. The cavity may be adapted to be filled with a liquid metal or another flowable electrically conductive substance (e.g., flowable conductor).

At numeral 730, a thin wall is created in the banking card. The thin wall is created between the cavity and the open circuit. In some instances, the thin wall is created so that it is easily punctured or broken. For example, the thin wall may be formed with a polymer or another material that is easily punctured. In some configurations, the banking card is configured to be flexed back and forth by grabbing onto opposite ends of the card with the banking customer's hands and manually flexing those two ends to break the thin wall to allow the flowable conductor to flow into an open circuit chamber/onto the open circuit and eliminate the open circuit.

At reference numeral 740, the cavity is filled. The cavity may be filled with a flowable conductor that is electrically conductive. In some instances, the cavity may be filled with a liquid metal such as mercury or galinstan.

In other instances, a flow in material may be used that can be any suitable conductive substance that would flow and stay in place, as understood by one of ordinary skill in the art. One example would be separated components of conductive epoxy. Separated components of conductive epoxy would flow and mix together, and harden to provide a conductive path. In another example conductive particles, such as metallic beads, are suspended in a gel substance, but also may provide a conductive pathway. In yet another example, the metallic beads may be mixed with a resin and then harden to provide a conductive pathway. In some instances a carbon fiber may be mixed with a matrix compound such as polymer, liquid plastic resin, or another similar compound with the resulting compound flowed into a desired conductive shape.

At reference numeral 750, instruction indications are provided to a banking customer, in some embodiments. The instruction indications may indicate how to manipulate the banking card to cause the liquid conductor to flow and remove the open circuit and allow the banking card to function correctly. The instruction indications may be instructions printed on a sticker attached to the banking card.

The method 700 may at times include other useful features and actions. For example a portion of the banking card is configured to be depressed with a finger to break the thin wall to allow the flowable electrical conductor to flow into an open circuit chamber and eliminate the open circuit. In some example instances, a notched portion of the banking card defines to the banking customer where the card may be flexed to break the thin wall to allow the flowable electrical conductor to flow into the short circuit chamber and eliminate the open circuit.

FIG. 8 depicts a method 800 for providing a banking customer a banking card. The method 800 can be implemented and performed by using, at least in part, the banking card 600 with first and second portions that is illustrated in FIG. 6.

At numeral 810, the method 800 producing a first portion of the banking card. The first portion is produced with an open circuit. The banking card can be a wireless banking card.

At reference numeral 820, a second portion of the banking card is produced. The second portion is produce with a locking mechanism. The first portion of the banking card is adapted to be slid together with the second portion of the banking card. The locking mechanism is adapted to attach the first portion of the banking card to the second portion of the banking card.

In another configuration, the locking mechanism is formed with a tang extending from the first portion of the banking card. The locking mechanism is further formed with a locking recessed area formed into the second portion of the banking card. The first portion of the banking card is adapted to be slid at least partially together with the second portion of the banking card to attach the first portion of the banking card to the second portion of the banking card. The tang of the first portion of the banking card extends into a recessed area of the locking recessed area of the second portion of the banking card locking the first portion of the banking card to the second portion of the banking card when the locking mechanism is in a locked position.

As used herein, the terms "component" and "system," as well as various forms thereof (e.g., components, systems, sub-systems . . . ) are intended to refer to a computer-related entity, either hardware, a combination of hardware and software, software, or software in execution. For example, a component may be but is not limited to being a process running on a processor, a processor, an object, an instance, an executable, a thread of execution, a program, and/or a computer. By way of illustration, both an application running on a computer and the computer can be a component. One or more components may reside within a process and/or thread of execution, and a component may be localized on one computer and/or distributed between two or more computers.

The conjunction "or" as used in this description and appended claims is intended to mean an inclusive "or" rather than an exclusive "or," unless otherwise specified or clear from the context. In other words, "'X' or 'Y'" is intended to mean any inclusive permutations of "X" and "Y." For example, if "'A' employs 'X,'" "'A employs 'Y,'" or "'A' employs both 'X' and 'Y,'" then "'A' employs 'X' or 'Y'" is satisfied under any of the preceding instances.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

To provide a context for the disclosed subject matter, FIG. 9, as well as the following discussion, are intended to provide a brief, general description of a suitable environment in which various aspects of the disclosed subject matter can be implemented. However, the suitable environment is solely an example and is not intended to suggest any limitation on scope of use or functionality.

While the above-disclosed banking cards and methods can be described in the general context of computer-executable instructions of a program that runs on one or more computers, those skilled in the art will recognize that aspects can also be implemented in combination with other program modules or the like. Generally, program modules include routines, programs, components, data structures, among other things, that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, server computers, as well as personal computers, hand-held computing devices (e.g., personal digital assistant (PDA), smartphone, tablet, watch . . . ), microprocessor-based or programmable consumer or industrial electronics, and the like. Aspects can also be practiced in distributed computing environments where tasks are performed by remote processing devices linked through a communications network. However, some, if not all aspects, of the disclosed subject matter can be practiced on stand-alone computers. In a distributed computing environment, program modules may be located in one or both of local and remote memory devices.

With reference to FIG. 9, illustrated is an example computing device 900 (e.g., desktop, laptop, tablet, watch, server, hand-held, programmable consumer or industrial electronics, set-top box, game system, compute node, . . . ). The computing device 900 includes one or more processor(s) 910, memory 920, system bus 930, storage device(s) 940, input device(s) 950, output device(s) 960, and communications connection(s) 970. The system bus 930 communicatively couples at least the above system constituents. However, the computing device 900, in its simplest form, can include one or more processors 910 coupled to memory 920, wherein the one or more processors 910 execute various computer-executable actions, instructions, and or components stored in the memory 920.

The processor(s) 910 can be implemented with a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 910 may also be implemented as a combination of computing devices, for example, a combination of a DSP and a microprocessor, a plurality of microprocessors, multi-core processors, one or more microprocessors in conjunction with a DSP core, or any other such configuration. In one embodiment, the processor(s) 910 can be a graphics processor unit (GPU) that performs calculations concerning digital image processing and computer graphics.

The computing device 900 can include or otherwise interact with a variety of computer-readable media to facilitate control of the computing device to implement one or more aspects of the disclosed subject matter. The computer-readable media can be any available media accessible to the computing device 900 and includes volatile and non-volatile media, and removable and non-removable media. Computer-readable media can comprise two distinct and mutually exclusive types: storage media and communication media.

Storage media includes volatile and non-volatile, removable and non-removable media implemented in any method or technology for storage of information such as computer-readable instructions, data structures, program modules, or other data. Storage media includes storage devices such as memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid-state devices (e.g., solid-state drive (SSD), flash memory drive (e.g., card, stick, key drive . . . ) . . . ), or any other like mediums that store, as opposed to transmit or communicate, the desired information accessible by the computing device 900. Accordingly, storage media excludes modulated data signals as well as that which is described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

The memory 920 and storage device(s) 940 are examples of computer-readable storage media. Depending on the configuration and type of computing device, the memory 920 may be volatile (e.g., random access memory (RAM)), non-volatile (e.g., read only memory (ROM), flash memory . . . ), or some combination of the two. By way of example, the basic input/output system (BIOS), including basic routines to transfer information between elements within the computing device 900, such as during start-up, can be stored in non-volatile memory, while volatile memory can act as external cache memory to facilitate processing by the processor(s) 910, among other things.

The storage device(s) 940 include removable/non-removable, volatile/non-volatile storage media for storage of vast amounts of data relative to the memory 920. For example, storage device(s) 940 include, but are not limited to, one or more devices such as a magnetic or optical disk drive, floppy disk drive, flash memory, solid-state drive, or memory stick.

Memory 920 and storage device(s) 940 can include, or have stored therein, operating system 980, one or more applications 986, one or more program modules 984, and data 982. The operating system 980 acts to control and allocate resources of the computing device 900. Applications 986 include one or both of system and application software and can exploit management of resources by the operating system 980 through program modules 984 and data 982 stored in the memory 920 and/or storage device(s) 940 to perform one or more actions. Accordingly, applications 986 can turn a general-purpose computer 900 into a specialized machine in accordance with the logic provided thereby.

All or portions of the disclosed subject matter can be implemented using standard programming and/or engineering techniques to produce software, firmware, hardware, or any combination thereof to control the computing device 900 to realize the disclosed functionality. By way of example and not limitation, all or portions of the banking card generator 132 can be, or form part of, the application 986, and include one or more modules 984 and data 982 stored in memory and/or storage device(s) 940 whose functionality can be realized when executed by one or more processor(s) 910.

In accordance with one particular embodiment, the processor(s) 910 can correspond to a system on a chip (SOC) or like architecture including, or in other words integrating, both hardware and software on a single integrated circuit substrate. Here, the processor(s) 910 can include one or more processors as well as memory at least similar to the processor(s) 910 and memory 920, among other things. Conventional processors include a minimal amount of hardware and software and rely extensively on external hardware and software. By contrast, a SOC implementation of a processor is more powerful, as it embeds hardware and software therein that enable particular functionality with minimal or no reliance on external hardware and software. For example, the banking card generator 132 and/or functionality associated therewith can be embedded within hardware in a SOC architecture.

The input device(s) 950 and output device(s) 960 can be communicatively coupled to the computing device 900. By way of example, the input device(s) 950 can include a pointing device (e.g., mouse, trackball, stylus, pen, touchpad, . . . ), keyboard, joystick, microphone, voice user interface system, camera, motion sensor, and a global positioning satellite (GPS) receiver and transmitter, among other things. The output device(s) 960, by way of example, can correspond to a display device (e.g., liquid crystal display (LCD), light emitting diode (LED), plasma, organic light-emitting diode display (OLED) . . . ), speakers, voice user interface system, printer, and vibration motor, among other things. The input device(s) 950 and output device(s) 960 can be connected to the computing device 900 by way of wired connection (e.g., bus), wireless connection (e.g., Wi-Fi, Bluetooth, . . . ), or a combination thereof.

The computing device 900 can also include communication connection(s) 970 to enable communication with at least a second computing device 902 utilizing a network 990. The communication connection(s) 970 can include wired or wireless communication mechanisms to support network communication. The network 990 can correspond to a local area network (LAN) or a wide area network (WAN) such as the Internet. The second computing device 902 can be another processor-based device with which the computing device 900 can interact. In one instance, the computing device 900 can execute a banking card generator 132 for a first function, and the second computing device 902 can execute a banking card generator 132 for a second function in a distributed processing environment. Further, the second computing device can provide a network-accessible service that stores source code, and encryption keys, among other things that can be employed by the banking card generator 132 executing on the computing device 900.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A method, comprising:
   creating a transaction card with an antenna with an open circuit in the antenna that prevents the transaction card from functioning correctly;
   creating a first cavity within the transaction card near a second cavity corresponding to the open circuit of the antenna;
   creating a thin wall within the transaction card between the first cavity and the second cavity corresponding to the open circuit of the antenna;
   filling the first cavity within the transaction card with a flowable conductor, such that the flowable conductor is configured to fill the second cavity corresponding to the open circuit of the antenna; and
   providing instruction indications to a user how to manipulate the transaction card to cause the flowable conductor (i) to flow from the first cavity into the second cavity and (ii) remove the open circuit of the antenna to allow the transaction card to function correctly.

2. The method of claim 1, wherein creating the transaction card further comprises: creating a wireless transaction card.

3. The method of claim 1, wherein filling the first cavity with the flowable conductor further comprises: filling the first cavity with a liquid metal.

4. The method of claim 3, wherein filling the first cavity with the liquid metal further comprises: filling the first cavity with galinstan.

5. The method of claim 3, wherein filling the first cavity with the liquid metal further comprises: filling the first cavity with liquid mercury.

6. The method of claim 1, wherein the thin wall is configured to be broken to allow the flowable conductor to flow from the first cavity into the second cavity by flexing the transaction card; and wherein the flowable conductor flows onto the open circuit of the antenna.

7. The method of claim 1, wherein the transaction card is configured to be flexed back and forth by grabbing two opposite ends of the transaction card with the user's hands and manually flexing the two opposite ends to break the thin wall to allow the flowable conductor to flow onto the open circuit to eliminate the open circuit.

8. The method of claim 1, wherein a portion of the transaction card is configured to be depressed with a finger to break the thin wall to allow the flowable conductor to flow from the first cavity, into the second cavity, and onto the open circuit to eliminate the open circuit.

9. The method of claim 1, wherein a notched portion of the transaction card defines to the user where the transaction card may be flex to break the thin wall to allow the flowable conductor to flow from the first cavity, into the second cavity, and onto the open circuit to eliminate the open circuit.

10. The method of claim 1, wherein the thin wall is a thin polymer membrane between the first cavity and the second cavity corresponding to the open circuit of the antenna.

11. The method of claim 1, further comprising: mailing the transaction card to the user.

12. A wireless card comprising:
    an antenna with an open circuit that prevents the wireless card from functioning correctly;
    a first cavity within the wireless card adjacent a second cavity associated with the open circuit;
    a thin wall between the first cavity and the second cavity associated with the open circuit, wherein the first cavity is filled with a liquid metal; and
    instruction indications on the wireless card instructing a user how to manipulate the wireless card to cause the liquid metal to flow from the first cavity into the second cavity, wherein the liquid metal (i) flows onto the open circuit and (ii) removes the open circuit to allow the wireless card to function correctly.

13. The wireless card of claim 12, wherein the first cavity is filled with liquid galinstan.

14. The wireless card of claim 12, wherein the first cavity is filled with liquid mercury.

15. The wireless card of claim 12, wherein the thin wall is configured to be broken to allow the liquid metal to flow out from the first cavity into the second cavity by flexing the wireless card.

16. The wireless card of claim 12, wherein the wireless card is configured to be flexed back and forth by grabbing two opposite ends of the wireless card with the user's hands and manually flexing the two opposite ends to allow the liquid metal to flow out from the first cavity, into the second cavity, and onto the open circuit and to eliminate the open circuit.

17. The wireless card of claim 12, wherein a portion of the wireless card is configured to be depressed to break the thin wall to allow the liquid metal to flow out from the first cavity, into the second cavity, and onto the open circuit and to eliminate the open circuit.

18. The wireless card of claim 12, wherein a notched portion of the wireless card defines to the user where the wireless card may be flexed to break the thin wall to allow the liquid metal to flow from the first cavity, into the second cavity, and onto the open circuit to eliminate the open circuit.

19. The wireless card of claim 12, wherein the thin wall is a thin polymer membrane adjacent the second cavity associated with the open circuit of the antenna.

20. The wireless card of claim 12, wherein the wireless card is mailed to the user.

\* \* \* \* \*